REFRACTIVE INDEX VS. COPOLYMER COMPOSITION

FIG. 1

A. POLYBUTYL ACRYLATE

B. POLYMETHYL METHACRYLATE

C. POLYVINYL CHLORIDE

D. (54:39:7) POLY(METHL METHACRYLATE:STYRENE: ACRYLONITRILE)

E. (75:25) POLY(STYRENE:ACRYLONITRILE)

F. POLYVINYLIDENE CHLORIDE

REFRACTIVE INDEX VS COPOLYMER COMPOSITION

FIG. 2

A. POLYBUTYL ACRYLATE
B. POLYMETHYL METHACRYLATE
C. POLYVINYL CHLORIDE
D. (54:39:7) POLY(METHYL METHACRYLATE: STYRENE: ACRYLONITRILE)
E. POLYBENZYL ACRYLATE

United States Patent Office 3,840,620
Patented Oct. 8, 1974

3,840,620
ADDITIVES FOR THE PREPARATION OF CLEAR, IMPACT RESISTANT VINYL CHLORIDE POLYMER COMPOSITIONS
Ruth Gallagher, Dobbs Ferry, N.Y., assignor to Stauffer Chemical Company, New York, N.Y.
Original application Apr. 15, 1970, Ser. No. 28,897, now abandoned. Divided and this application Aug. 19, 1971, Ser. No. 165,803
Int. Cl. C08f 29/24
U.S. Cl. 260—899
24 Claims

ABSTRACT OF THE DISCLOSURE

Novel additives comprising copolymers of lower alkyl acrylates with either benzyl acrylate or vinylidene chloride are disclosed. It is further shown that these additives provide excellent results in the preparation of clear, impact resistant, thermoplastic compositions which comprise blends of the aforedescribed additives with a homo- or copolymer of vinyl chloride.

RELATED APPLICATION

This application is a division of application Ser. No. 28,897, filed Apr. 15, 1970, now abandoned.

Background of the Invention

In order to improve their impact strength, it is a common practice to employ particles of rubber polymers to reinforce polyvinyl chloride (PVC), the various rigid copolymers of vinyl chloride as well as other hard, brittle thermoplastics such as polymethyl methacrylate, polystyrene, styrene-acrylonitrile copolymers and the like. As is known to those skilled in the art, the possession of a high degree of impact strength, i.e. the ability to withstand a rapidly applied shock, is an extremely desirable characteristic in any thermoplastic which is to be used for the preparation of cast or molded objects.

With respect to PVC and the rigid copolymers of vinyl chloride, the rubber additives most commonly utilized for the improvement of impact strength are the polyacrylates, polybutadiene and the copolymers of butadiene with acrylonitrile and/or styrene. Unfortunately, the use of the latter types of impact additives does not provide completely satisfactory results. Thus, while polybutadiene and the butadiene copolymers yields blends with PVC or with vinyl chloride copolymers which display good impact strength and clarity, such blends are generally characterized by the fact that they become yellow during subsequent processing steps and also by their poor, long term oxidative stability. On the other hand, the use of polyacrylate impact additives, yields compositions which have good stabiilty but which are, however, decidedly opaque.

It is, therefore, a prime object of this invention to provide a novel class of additives for use with the homo- and copolymers of vinyl chloride which, when blended with the latter polymers, will yield compositions which while displaying high impact strength will also be characterized by their outstanding clarity, the absence of yellowing during processing and their excellent long term oxidative stability. Various other objects and advantages of this invention will be apparent from the disclosure which follows hereinafter.

TECHNICAL DISCLOSURE OF THE INVENTION

It has now been discovered that the use, as impact additives for PVC and the rigid copolymers of vinyl cholride, of copolymers of the $C_1$–$C_{12}$ alkyl esters of acrylic acid with either benzyl acrylate or vinylidene chloride yields high impact compositions of excellent clarity which do not yellow during processing and which have good long term oxidative stability.

The novel impact additives of this invention comprise copolymers of:

(1) One or more $C_1$–$C_{12}$ alkyl acrylates including, for example, methyl, butyl, isobutyl, n-hexyl, 2-ethylhexyl, n-octyl, nonyl, decyl and lauryl acrylate with the use of butyl acrylate being preferred; and (2) A second monomer selected from the group consisting of benzyl acrylate and vinylidene chloride. Also applicable are substituted benzyl acrylates, i.e. wherein the phenyl ring of the benzyl acrylate may be substituted with one or more lower alkyl, halo or nitrile groups.

It should be noted at this point, that the term "copolymer," as used in this disclosure, is meant to encompass polymers derived from mixtures of two, three, or four or more monomers.

While the copolymers of some of the $C_1$–$C_{12}$ alkyl acrylates are disclosed in the literature, they have not heretofore been suggested for use as impact additives for PVC and the rigid copolymers of vinyl chloride. However, the copolymers of the $C_1$–$C_{12}$ alkyl acrylates with benzyl acrylate are believed to comprise new compositions of matter which are not, per se, disclosed in the literature.

The polymeric substrates with which these novel impact additives may be blended as part of the novel process of this invention include, as already been stated, PVC and the rigid copolymers of vinyl chloride. The latter rigid copolymers include, for example, copolymers containing a major proportion, by weight, of vinyl chloride together with one or more ethylenically unsaturated comonomers which may include, for example: vinyl esters of aliphatic and aromatic acids such as vinyl acetate, vinyl propionate and vinyl benzoate; vinylidene halides such as vinylidene chloride; $C_1$–$C_{12}$ alkyl esters of acrylic and methacrylic acid such as the methyl, butyl, 2-ethylhexyl and lauryl esters of acrylic and methacrylic acids, the $C_1$–$C_{12}$ mono- and dialkyl esters of ethylenically unsaturated dicarboxylic acids such as dibutyl fumarate and mono-methyl maleate; ethylenically unsaturated aromatic compounds such as styrene and alpha-methyl styrene; ethylenically unsaturated mono- and discarboxylic acids, their amides, anhydrides, and nitriles such as acrylic, methacrylic, fumaric, maleic, itaconic, citraconic and aconitic acids; acrylonitrile, methacrylonitrile, acrylamide, methacrylamide, maleimide and maleic anhydride; and, $C_1$–$C_{18}$ alkyl vinyl ethers such as methyl vinyl ether and stearyl vinyl ether. The preparation of PVC and of the rigid copolymers of vinyl chloride may be accomplished by means of polymerization procedures well known to those skilled in the art such, for example, as the free radical initiated bulk, suspension, emulsion and solution polymerization techniques.

Particularly useful as a polymeric substrate for use in the process of this invention are copolymers of vinyl chloride with up to about 20%, by weight, of vinyl acetate. It should also be noted that the impact additives of this invention can, if desired, be successfully employed with a variety of rigid thermoplastic polymers other than the homo- and copolymers of vinyl chloride. Thus, for example, these additives may be employed with polymethacrylonitrile, polymethyl methacrylate, polystyrene, poly(styrene - acrylonitrile), poly(methyl methacrylate-styrene-acrylonitrile), and poly(methyl methacrylate-ethyl acrylate) as well as any of the possible copolymers of acrylonitrile, methacrylonitrile, styrene, alpha - methyl styrene, methyl methacrylate and ethyl acrylate.

The preparation of the novel impact additives of this invention may be conveniently accomplished by means of emulsion polymerization procedures well known to those skilled in the art which may be of either the one-step or seeded type using conventional emulsifiers and water soluble, free radical initiating catalysts. Thus, the selected monomers may be emulsified in water containing an effective concentration, e.g. from about 0.05 to 5%, as based on the total weight of the monomer charge, of one or more anionic, non-ionic or cationic emulsifiers such, for example, as the alkyl carboxylic acid salts, the alkyl sulfate salts, the alkyl sulfonate salts, the alkyl phosphate salts, the alkyl sulfosuccinate salts, the alkyl aryl ether alcohols and the alkyl aryl polyether sulfate salts. As a water soluble catalyst, one may utilize from about 0.05 to about 1%, as based on the total weight of the monomer charge, of a peroxy type compound such, for example, as hydrogen peroxide, ammonium, sodium or potassium persulfate or a redox type catalyst, such as mixtures of a persulfate with alkali metal bisulfites, thiosulfates or hydrosulfites.

Polymerization is then initiated by heating the catalyzed, aqueous monomer emulsion to a temperature of from about 20–100° C. and maintaining it within the latter range for a period of from about 0.05 to 20 hours. The resulting copolymer emulsion should preferably have a resin solids content in the range of from about 10 to 50% by weight. The copolymer particles should have a particle size in the range of from about 0.03–2.0 microns with the larger particle sizes being attained by the use of seed polymerization procedures whereby the polymerization is conducted in the presence of a previously prepared emulsion containing particles of one of the above described copolymer additives.

The novel impact additive copolymers of this invention should be prepared so as to contain from about 5 to 99%, and preferably 30 to 70%, by weight, of one or more $C_1$–$C_{12}$ alkyl acrylates and from about 5 to 99%, and preferably 30–70%, by weight, of benzyl acrylate and or vinylidene chloride. If desired, these polymeric impact additives may be prepared in crosslinked form by the inclusion, in the initial polymerization recipe, of a vinyl monomer containing at least two reactive vinyl groups such, for example, as butylene glycol dimethacrylate, ethylene glycol dimethacrylate, divinyl benzene, allyl methacrylate, allyl acrylate, divinyl oxyethyl ether and diallyl adipate. The moieties derived from these optional crosslinking monomers may be present in the impact additives of this invention in a concentration of from about 0.1 to 5.0%, by weight.

Other optional monomers which are non-crosslinking may also be used in preparing the impact additive copolymers of this invention as a replacement for part of either their benzyl acrylate or vinylidene chloride component. Thus, these copolymer additives may contain up to about 40%, by weight, of one or more monomers which may include for example: vinyl esters of aliphatic and aromatic acids such as vinyl acetate, vinyl propionate and vinyl benzoate; vinylidene halides such as vinylidene chloride; $C_1$–$C_{12}$ alkyl esters of acrylic and methacrylic acid such as the methyl, butyl, 2-ethylhexyl and lauryl esters of acrylic and methacrylic acid; the $C_1$–$C_{12}$ mono- and dialkyl esters of ethylenically unsaturated dicarboxylic acids such as dibutyl fumarate, monomethyl maleate, ethylenically unsaturated aromatic compounds such as styrene and alpha-methyl styrene; ethylenically unsaturated mono- and dicarboxylic acids, their amides, nitriles and anhydrides such as acrylic methacrylic, fumaric, maleic, itaconic, citraconic and aconitic acids, arylonitrile, methacrylonitrile, acrylamide, methacrylamide, maleimide and maleic anhydride; and, $C_1$–$C_{18}$ alkyl vinyl ethers such as methyl vinyl ether and stearyl vinyl ether.

The actual blending of the impact additives of this invention with the selected polymeric substrate, i.e. with PVC or with a rigid vinyl chloride copolymer, may be accomplished by means of any convenient procedure which will result in an intimate admixture of the impact additive within the mass of the substrate polymer. Thus, for example, the aqueous latex containing the particles of the copolymer additive may be coagulated or spray dried so as to yield the additive in a dry, powdery solid form which can then simply be mill blended or otherwise admixed with the substrate polymer which should also be in the form of a dry powder. Or, if desired, the additive and the substrate may be admixed while each is in the form of an aqueous latex or suspension and the resulting mixture coagulated or spray dried so as to obtain a dry blend.

The blending operation may also be carried out by means of a procedure in which the PVC or vinyl chloride copolymer which comprises the substrate is itself polymerized by means of an aqueous emulsion procedure, as described hereinabove, while in the presence of an aqueous emulsion containing particles of one or more of the copolymer additives of this invention. Alternatively, the PVC or rigid vinyl chloride copolymer which comprises the substrate polymer can be polymerized by means of an aqueous suspension procedure, as will be described hereinbelow, in the presence of an aqueous emulsion containing one or more of the copolymer additives of this invention. With either of these blending procedures involving a polymerization step, the resulting impact resistant composition will be in the form of discrete particles of an interpolymer having an essentially heterogeneous composition in which the vinyl chloride mono- or copolymer substrate has been polymerized in and/or around the previously prepared impact additive copolymer particles.

As is known to those skilled in the art, suspension polymerization involves a process wherein one or more monomers are dispersed in a suspension medium, usually water, which is a non-solvent for both the monomer phase and the resulting polymer. The polymerization is then conducted, under agitation, in the presence of a suspending agent, such as talc, clay, polyvinyl, alcohol, gelatine, hydroxymethyl cellulose or carboxymethyl cellulose, and a monomer soluble catalyst such as azobisisobutyronitrile, lauroyl peroxide, benzoyl peroxide, or isopropyl peroxydicarbonate. The resulting polymer particles are of a relatively larger mass, as compared with the particles obtained from an emulsion polymerization procedure, and will tend to more rapidly separate out from the suspension.

With respect to proportions, the novel, high clarity, impact resistant composition resulting from the process of this invention, i.e. the blends comprising an intimate admixture of the selected impact additive copolymer and a PVC or rigid vinyl chloride copolymer substrate, should be prepared so that from about 1 to about 35% of their total weight may comprise one or more of the above described impact additive copolymers. Optimum results are apparently realized with compositions containing one or more of these additives in a concentration of from about 5–15%, by weight. The precise concentration of impact additive that is utilized will be largely dependent upon the physical properties that are desired in the resulting composition. Thus, the presence of a higher concentration of the additive will generally result in a composition having a greater degree of impact resistance. It may also be noted that if the product resulting from the blending or interpolymerization of the impact additive copolymer with PVC, a rigid vinyl chloride copolymer or some other thermoplastic polymer substrate containing more of the impact additive copolymer than is required, the blend or interpolymer may be diluted with an additional quantity of the substrate polymer in order to achieve any desired level of impact resistance.

The selection of a particular impact additive copolymer for use in preparing a PVC or rigid vinyl chloride copolymer blend will be governed by the refractive index of the PVC or rigid vinyl chloride copolymer substrate with which it is to be admixed. Thus, the clarity, and therefore the utility, of the resulting blend is for the most part dependent upon choosing a copolymer additive whose refractive index ($R_f$) is essentially identical to the $R_f$ of the PVC or rigid vinyl chloride copolymer substrate which is to be admixed therewith. For example, since PVC, at about 20° C., has a $R_f$ of from about $1.53$–$1.54_n$ one could use, for example, a butyl acrylate:vinylidene chloride (45:55) copolymer or a butyl acrylate:benzyl acrylate (55:45) copolymer either of which has a $R_f$ of about 1.53. Or, one may employ any of the other copolymer additives of this invention which may have a $R_f$ value close to 1.539 in order to obtain an impact resistant composition displaying a high degree of clarity. Therefore, as the difference between the $R_f$ value of the copolymer additive and the $R_f$ value of the PVC or of the vinyl chloride copolymer substrate is increased, the clarity of the resulting mixture will, in turn, be progressively decreased.

Accordingly, the practitioner in the art need merely determine the $R_f$ value of his polymeric substrate, using any of the commercially available refractometers, prior to selecting a particular copolymer additive for admixture therewith. Moreover, it is quite simple to prepare the copolymer additives of this invention so as to obtain products displaying a broad range of refractive indices. This is made possible by the fact that the $R_f$ of a particular copolymer system can be varied in a direct relationship to its monomer ratio.

For example, with respect to the copolymers of butyl acrylate and either benzyl acrylate or vinylidene chloride, an increase in either their benzyl acrylate or vinylidene chloride content results in an increase, in a direct linear relationship, in their $R_f$ value.

The above described relationship between the refractive indices of the copolymer additives of this invention and various polymeric substrates are demonstrated in the appended drawings. Thus.

Figure 1:
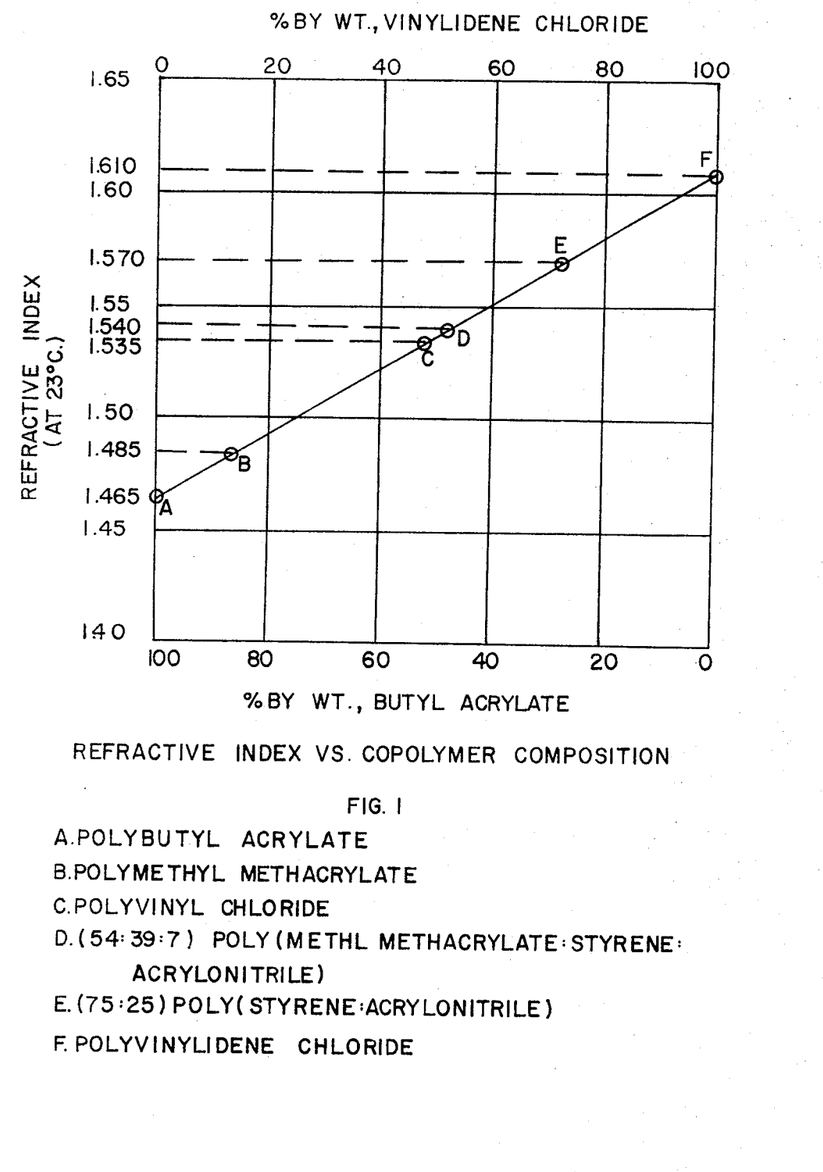
FIG. 1 is a graph illustrating: (1) the $R_f$ values of various polymer substrates as depicted on the vertical axis; (2) the percent, by weight, of butyl acrylate in a butyl acrylate:vinylidene chloride copolymer system on the lower horizontal axis; and (3) the percent, by weight, of vinylidene chloride in the same copolymer system on the upper horizontal axis.
Figure 2:
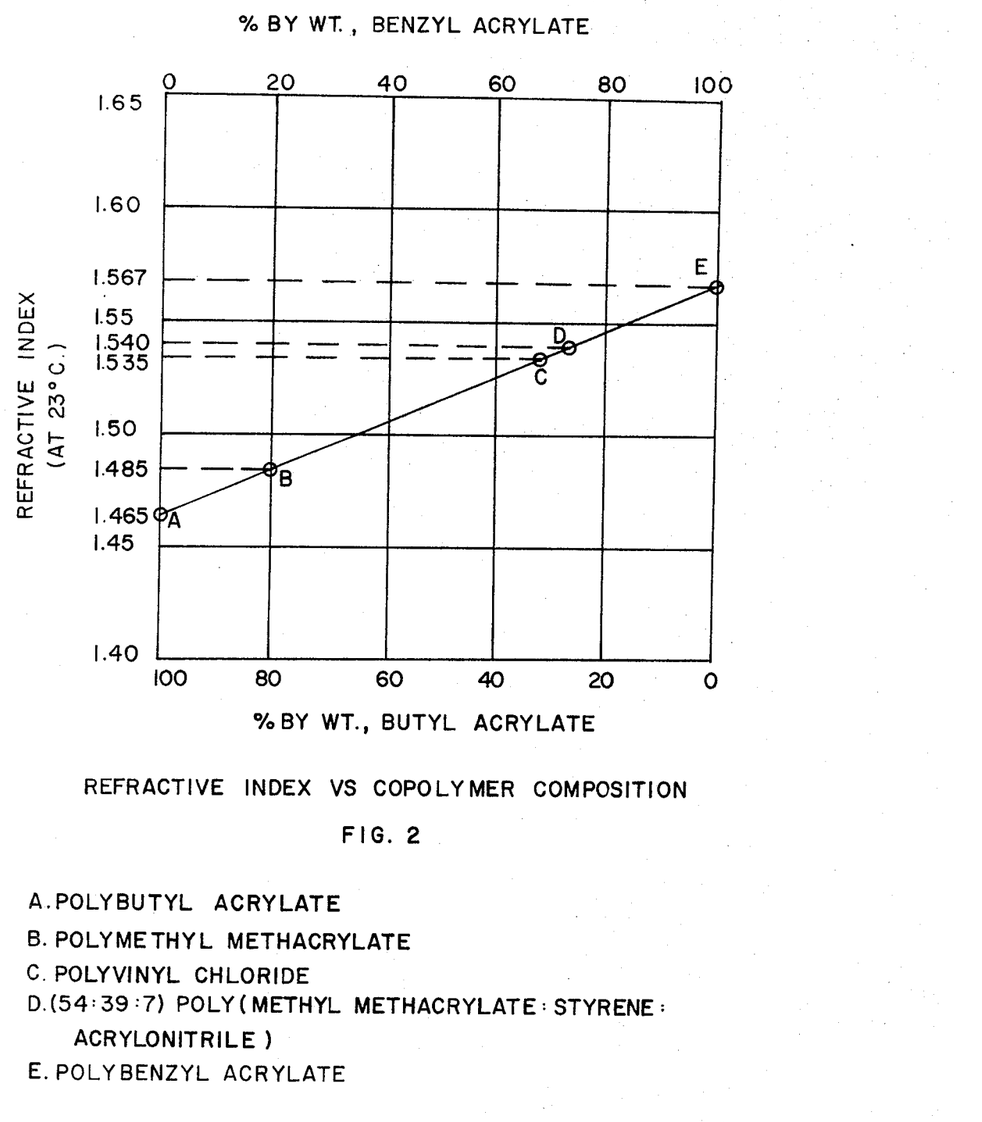
FIG. 2, on the other hand, is a graph illustrating: (1) the $R_f$ values of various polymer substrates on the vertical axis; (2) the percent, by weight, of butyl acrylate in a butyl acrylate:benzyl acrylate copolymer system on the lower horizontal axis; and (3) the percent, by weight, of benzyl acrylate in this same copolymer system on the upper horizontal axis.

Thus, the diagonal line in each of FIGS. 1 and 2, readily reveals the relationship between the composition of each copolymer system and its refractive index, i.e. it reveals the $R_f$ for every combination of the two comonomers within the copolymer system, thereby permitting the practitioner to select the precise copolymer composition whose refractive index is equivalent to that of the particular polymeric substrate with which it is to be blended or interpolymerized. In particular, FIG. 1 reveals that a butyl acrylate copolymer containing about 50%, by weight, of vinylidene chloride will have a $R_f$ of about 1.53 and can, therefore, be used with PVC which has the identical $R_f$ value. On the other hand, FIG. 2 reveals that a copolymer of butyl acrylate with about 25%, by weight, of benzyl acrylate will have a $R_f$ of only about 1.49 and can be used with polymethyl methacrylate which has the identical $R_f$ value. In general, for use with a PVC or a rigid vinyl chloride copolymer substrate, the impact additive copolymers of this invention may have a monomer ratio in the range of from about 35:65 to 65:35 $C_1$–$C_{12}$ alkyl acrylate ester:benzyl acrylate or vinylidene chloride with one or more optional comonomers being able to replace a portion of the benzyl acrylate or vinylidene chloride content of the copolymer.

The high clarity, impact resistant compositions of this invention can be prepared so as to contain various optional additives which may include, for example, plasticizers such as the alkyl esters of phthalic, adipic and sebacic acids and aryl phosphate esters such, for example, as dioctyl phthalate, ditridecyl phthalate and tricresyl phosphate, etc.; lubricants such as stearic acid or its metal salts, petroleum based waxes, mineral oils, polyethylene, etc.; and heat and light stabilizers such as CaZn stearate, basic lead compounds, tin compounds, epoxidized oils, phenyl salicylates, benzophenones and benzotriazoles, etc. For a more complete listing of plasticizers, lubricants, stabilizers and other functional additives, one may consult "Polyvinyl Chloride" by H. A. Sarvetnick published by Van Nostrand Reinhold Co., New York, N.Y., in 1969.

The high clarity, impact resistant polymeric compositions resulting from the admixture of one or more of the above described impact additive copolymers with PVC or a rigid vinyl chloride copolymer substrate may be utilized in any of the coating, impregnating and molding applications known to those skilled in the art. For example, these compositions may be used for preparing such diverse items as calendered films, blow molded bottles, extruded flat bed and blown films, extruded articles and tubing, etc., and in carrying out such processes as injection molding, fluidized bed coating, electrostatic powder spraying and rotational coating, etc.

The following examples will further illustrate the embodiment of the invention. In these examples, all parts given are by weight unless otherwise noted.

EXAMPLE I

This example illustrates the preparation of a number of butyl acrylate:vinylidene chloride copolymer rubber impact additives, for use in the process of this invention.

The following table describes the ingredients present in a number of polymerization recipes each of which was polymerized by being introduced into one quart bottles which were capped, and heated at 70° C. for a period of 4½ hours while being rotated at 20 r.p.m. Recipes Nos. 8 and 9, however, were heated for 9 hours at 78° C. while being rotated at 20 r.p.m. The resulting copolymer products were obtained as stable aqueous latices having a resin solids content of about 27%, by weight, wherein the copolymer particles had a particle size range of from about 0.2–0.3 microns.

INITIAL COMPOSITION OF POLYMERIZATION RECIPE

| Recipe number | Compolyer composition [1] | $H_2O$ | Emulsifier 1% aqueous solution [2] | 2% aqueous solution of $K_2S_2O_8$ | Vinylidene chloride | Butyl acrylate | Styrene | Butylene glycol-dimethacrylate |
|---|---|---|---|---|---|---|---|---|
| 1 | 68/30/2 | 315 | 90 | 45 | 54 | 122 | | 3.6 |
| 2 | 63/35/2 | 315 | 90 | 45 | 63 | 113 | | 3.6 |
| 3 | 53/45/2 | 315 | 90 | 45 | 81 | 96 | | 3.6 |
| 4 | 48/50/2 | 315 | 90 | 45 | 90 | 87 | | 3.6 |
| 5 | 43/55/2 | 315 | 90 | 45 | 99 | 77 | | 3.6 |
| 6 | 38/60/2 | 315 | 90 | 45 | 108 | 68 | | 3.6 |
| 7 | 33/65/2 | 315 | 90 | 45 | 117 | 59 | | 3.6 |
| 8 | 43/40/2/15 | 315 | 90 | 45 | 72 | 77 | 27 | 3.6 |
| 9 | 48/40/2/10 | 315 | 90 | 45 | 72 | 86 | 18 | 3.6 |
| 10 | 45/55 | 315 | 90 | 45 | 99 | 80 | | |

[1] The monomer ratio of each copolymer in the Table is given in the sequence: butyl acrylate vinylidene chloride butylene glycol dimethacrylate styrene (styrene is present only in Nos. 8 and 9).
[2] An anionic surfactant comprising the bis(tridecyl) ester of sodium sulfosuccinic acid.

EXAMPLE II

This example illustrates the preparation of a number of impact resistant PVC compositions which contained, respectively, the various copolymer additives whose preparation is described in Example I, hereinabove. In this instance, the procedure utilized for the preparation of these compositions involved the polymerization of PVC in the presence of an aqueous latex of the previously prepared impact additive copolymer particles. The relationship between the clarity of these compositions and the monomer ratio of the particular impact additive copolymer utilized for their preparation is also shown, the monomer ratio being directly determinative of the refractive index of the copolymer.

The following table describes the ingredients of a number of suspension polymerization recipes each of which was introduced into one quart bottles which were capped and heated at 60° C. for a period of 9 hours while being rotated at 37 r.p.m. In each case, there was produced an aqueous suspension containing about 27%, by weight, of particles each of which comprised an intimate, essentially heterogeneous admixture of interpolymer of PVC and about 15%, as based on the total weight of each particle, of the particular copolymer additive in whose presence it had been polymerized. In these interpolymer particles, the vinyl chloride had been polymerized in and/or around the particles of the impact additive copolymer. These interpolymer particles were recovered from their respective suspensions on a Büchner funnel and then air dried.

In this table, the numbers assigned to the copolymer impact additives correspond to the number by which these additives were identified in the Table set forth in Example I hereinabove.

| | Initial composition of polymerization recipe | | | | | |
|---|---|---|---|---|---|---|
| Recipe No. | Impact additive copolymer latex No. | Impact additive copolymer latex | Water | 1% solution of methyl cellulose | Azobisisobutyronitrile | Vinyl chloride monomer |
| 1 | 1 | 56 | 196 | 72 | 0.075 | 100 |
| 2 | 2 | 56 | 196 | 72 | 0.075 | 100 |
| 3 | 3 | 56 | 196 | 72 | 0.075 | 100 |
| 4 | 4 | 56 | 196 | 72 | 0.075 | 100 |
| 5 | 5 | 56 | 196 | 72 | 0.075 | 100 |
| 6 | 6 | 56 | 196 | 72 | 0.075 | 100 |
| 7 | 7 | 56 | 196 | 72 | 0.075 | 100 |
| 8 | 8 | 56 | 196 | 72 | 0.075 | 100 |
| 9 | 9 | 56 | 196 | 72 | 0.075 | 100 |
| 10 | 10 | 56 | 196 | 72 | 0.075 | 100 |

The clarity of these interpolymer particles was evaluated by means of a procedure in which 3.0 parts of each respective interpolymer was mixed by hand for about 2–3 minutes with 6.5 parts of dioctyl phthalate and 0.1 parts of an alkyl tin thioglycollate stabilizer as sold by M & T Chemicals, Inc. under the trademark "Thermolite 31." A thin layer of each of the resulting plastisol mixtures was then spread upon a petri dish. The thus coated dishes were thereupon heated in an oven set at 190° C. for a period of about 25–30 minutes. Upon being removed from the oven, the dried plastisol coatings contained within each dish were visually examined in order to evaluate their clarity. The results of these observations are set forth in the following table:

| Plastisol based on additive No. | Percent vinylidene chloride in impact additive | Clarity of dried plastisol coating |
|---|---|---|
| 1 | 30 | Distinctly noticeable haze. |
| 2 | 35 | Do. |
| 3 | 45 | Slight haze. |
| 4 | 50 | Very slight haze. |
| 5 | 55 | Clear. |
| 10 | 55 | Clear. |
| Control[1] | | Clear. |
| 6 | 60 | Clear. |
| 7 | 65 | Very slight haze. |
| 8 | 40 (+15% styrene) | Clear. |
| 9 | 40 (+10% styrene) | Very slight haze. |

[1] The control comprised a sample of unmodified PVC which had been polymerized by means of the identical procedure described hereinabove with the exception that it was not conducted in the presence of an aqueous atex of an impact additive copolymer.

The results shown in the above table indicate that maximum clarity is achieved, with PVC as the substrate, using butyl acrylate:vinylidene chloride copolymer additives which contain from about 55–60%, by weight, of vinylidene chloride. It is also revealed that styrene can be substituted for a portion of the vinylidene chloride content of the copolymer additive without any loss in clarity.

EXAMPLE III

This example illustrates the preparation of a clear, impact resistant PVC composition by means of the process of this invention.

Part 1.—Preparation of a 0.3 micron 55:43:2 vinylidene chloride/2-ethylhexyl acrylate butylene glycol dimethacrylate copolymer latex The following reactants were introduced into a one quart bottle which was capped and heated for 3½ hours at 70° C. while being rotated at 20 r.p.m.

315 gms. $H_2O$
68 ml. of a 1% aqueous solution of the bis(tridecyl) ester of sodium sulfosuccinic acid.
45 ml. of a 2% aqueous solution of potassium persulfate.
99 gms. of vinylidene chloride.
77 gms. 2-ethylhexyl acrylate.
3.6 gms. butylene glycol dimethacrylate.

By means of this procedure a latex whose particles had a particle size of about 0.3 microns and which had a 25% resin solids content was obtained.

Part. 2.—Preparation of a 0.6 micron 55:43:2 vinylidene chloride/ethylhexyl acrylate/butylene glycol dimethacrylate copolymer latex The following reactants were introduced in a 1 quart bottle which was capped and heated for 3½ hours at 70–75° C. while being rotated at 20 r.p.m.

73 gms. of the aqueous copolymer whose preparation was described in Part 1 hereinabove.
1.5 ml. of a 1% aqueous solution of the bis(tridecyl) ester of sodium sulfosuccinic acid.
318 gms. water.
39 ml. of 2% aqueous solution of potassium persulfate.
88 gms. vinylidene chloride.
69 gms. 2-ethylhexyl acrylate.
3.6 gms. butylene glycol dimethacrylate.

This procedure yielded a latex whose copolymer particles had a particle size of about 0.6 microns and a resin solids content of about 28%.

Part 3.—Preparation of a PVC-(vinylidene chloride:2-ethylhexyl acrylate:butylene glycol dimethacrylate) suspension-emulsion interpolymer.

The following reactants were introduced into a one quart bottle which was capped and heated for 8 hours at 60° C. while being rotated at 40 r.p.m.

54 gms. of the copolymer latex whose preparation was described in Part 2 hereinabove.
196 gms. water.
72 ml. of a 1% aqueous solution of methyl cellulose.
0.075 gms. of azobisisobutyronitrile.
100 gms. vinyl chloride.

This procedure yielded an aqueous solution suspension of particles each of which comprised an intimate, essentially heterogeneous admixture or interpolymer of PVC and about 15%, as based on the total weight of each interpolymer particle, of the impact additive copolymer whose preparation was described in Part 2 hereinabove. These interpolymer particles were recovered from the aqueous suspension on a Büchner funnel and then air dried.

EXAMPLE IV

This example illustrates the results obtained upon evaluating the tensile and tensile impact strength of a number of the copolymer additives whose preparation was described in Example I as well as of the PVC-additive interpolymer whose preparation was described in Part 3 of Example III. In each case, a comparison is provided in which the additive or interpolymer is dilated, i.e. physically admixed, with PVC.

In evaluating these additive copolymers and interpolymer products, they were either milled alone or first diluted with the indicated amount of a commercially available polyvinyl chloride resin. In either case, the milling was conducted on a two-roll mill operating at 350–360° F. for a period of three minutes. As stabilizers, each sample contained 3 phr. of "Thermolite 31" and 0.5 phr. of calcium stearate. The following table describes the composition of the various samples which were evaluated as well as the results obtained.

monomer ratio being directly determinative of the refractive index of the copolymer.

The following table describes the ingredients of a number of suspension polymerization recipes each of which was introduced into one quart bottles which were capped and heated at 60° C. for a period of 9 hours while being rotated at 37 r.p.m. In each case, there was produced an aqueous suspension containing about 27%, by weight, of particles each of which comprised an intimate, essentially heterogeneous admixture or interpolymer of PVC and about 15%, as based on the total weight of each particle, of the particular copolymer additive in whose presence it had been polymerized. In these interpolymer particles, the vinyl chloride had been polymerized in and/or

| Product being tested | Percent of product used | Percent PVC used for dilution [a] | Final concentration of rubber copolymer additive or interpolymer | Tensile strength [b] (p.s.i.) | Tensile impact strength [c] (ft./lbs./in.²) | Appearance of milled product |
|---|---|---|---|---|---|---|
| Unmodified PVC control | | 100 | 0 | 8,050 | 95 | Clear. |
| Commercially available additive [d] | 10 | 90 | | 6,800 | 117 | Do. |
| Copolymer No. 5 of Example I | 100 | | 15 | 5,090 | 208 | Do. |
| Do | 66 | 33 | 10 | 6,230 | 106 | Do. |
| Interpolymer of Example III, Part 3 | 100 | | 15 | 6,300 | 150 | Do. |
| Do | 66 | 33 | 10 | 6,900 | 133 | Do. |

[a] PVC having a relative viscosity of 0.11 as determined at 30° C. in a 1 gm. deciliter solution of cyclohexanone.
[b] As determined by means of ASTM Procedure D-1708.
[c] As determined by means of ASTM Procedure D-1822.
[d] A methyl methacrylate:acrylonitrile:butadiene:styrene interpolymer sold as "Kane Ace B-12" by the Kanegfauchi Chemical Company.

The results shown in the above table indicate the improved impact strength inherent in the compositions resulting from the process of this invention when compared with unmodified PVC.

EXAMPLE V

This example illustrates the preparation of a number of butyl acrylate:benzyl acrylate copolymer rubbers, i.e. impact additives, for use in the process of this invention.

The following table describes the ingredients present in a number of polymerization recipes each of which was polymerized by being introduced into 16 oz. bottles which were then purged with nitrogen for ten minutes. The bottles were then capped and heated at 70° C. for 3 hrs. while being rotated at 20 r.p.m. The resulting copolymer rubbers were obtained as stable aqueous latices having a resin solids content of about 27–29%, by weight, wherein the copolymer particles had a particle size of about 0.2–0.3 microns.

around the particles of the impact additive copolymer. These interpolymer particles were recovered from their respective suspensions on a Büchner funnel and then air dried.

| | Initial composition of polymerization recipe | | | | | |
|---|---|---|---|---|---|---|
| Recipe No. | Impact additive copolymer latex No.[1] | Impact additive copolymer latex No. | Water | 1% solution of methylis cellulose | Azobisobutyronitrile | Vinyl chloride monomer |
| 1 | 1 | 58 | 200 | 72 | 0.075 | 100 |
| 2 | 2 | 58 | 200 | 72 | 0.075 | 100 |
| 3 | 3 | 58 | 200 | 72 | 0.075 | 100 |
| 4 | 4 | 58 | 200 | 72 | 0.075 | 100 |
| 5 | 5 | 58 | 200 | 72 | 0.075 | 100 |
| 6 | 6 | 58 | 200 | 72 | 0.075 | 100 |
| 7 | 7 | 58 | 200 | 72 | 0.075 | 100 |
| 8 | 8 | 58 | 200 | 72 | 0.075 | 100 |
| 9 | 9 | 58 | 200 | 72 | 0.075 | 100 |

[1] In this table, the numbers assigned to the copolymer impact additives correspond to the number by which these additives were identified in the table set forth in Example V hereinabove.

| | Initial composition of polymerization recipe | | | | | | |
|---|---|---|---|---|---|---|---|
| Recipe number | Copolymer composition [1] | H₂O | Emulsifier 1% aqueous solution [2] | M1 30% aqueous H₂O₂ solution | Butyl acrylate | Benzyl acrylate | Butylene glycol dimethacrylate |
| 1 | 53/45/2 | 134 | 41 | 3.5 | 44 | 37.4 | 1.65 |
| 2 | 48/50/2 | 134 | 41 | 3.5 | 40 | 41.5 | 1.65 |
| 3 | 43/55/2 | 134 | 41 | 3.5 | 35.6 | 45.5 | 1.65 |
| 4 | 38/60/2 | 134 | 41 | 3.5 | 31.5 | 50 | 1.65 |
| 5 | 28/70/2 | 134 | 41 | 3.5 | 23.2 | 58 | 1.65 |
| 6 | 23/75/2 | 135 | 41 | 3.5 | 19 | 62 | 1.65 |
| 7 | 18/80/2 | 134 | 41 | 3.5 | 15 | 67 | 1.65 |
| 8 | 13/85/2 | 134 | 41 | 3.5 | 10.8 | 70.5 | 1.65 |
| 9 | 40/60 | 134 | 41 | 3.5 | 33 | 50 | None |

[1] The monomer ratio of each copolymer in the table is given in the sequence: butyl acrylate benzylacrolate butylene glycol dimethacrylate except in No. 9 wherein no butylene glycol dimethacrylate is present.
[2] An anionic surfactant comprising the bis(tridecyl) ester of sodium sulfosuccinic acid.

EXAMPLE VI

This example illustrates the preparation of a number of impact resistant PVC compositions which contained, respectively, the various copolymer additives whose preparation is described in Example V, hereinabove. In this instance, the procedure utilized for the preparation of these compositions involved the polymerization of PVC in the presence of an aqueous latex of the previously prepared impact additive copolymer particles. The relationship between the clarity of these compositions and the monomer ratio of the particular impact additive copolymer utilized for their preparation is also shown, the The clarity of these interpolymer particles was evaluated by means of a procedure in which 3.0 parts of each respective interpolymer was mixed by hand for about 2–3 minutes with 6.5 parts of dioctyl phthalate and 0.1 parts of an alkyl tin thioglycollate stabilizer as sold by M & T Chemicals, Inc. under the trademark "Thermolite 31." A thin layer of each of the resulting plastisol mixtures was then spread upon a petri dish. The thus coated dishes were thereupon heated in an oven set at 190° C. for a period of about 25–30 minutes. Upon being removed from the oven, the dried plastisol coatings contained within each dish were visually examined in order to evaluate their clarity. The results of these observations are set forth in the following table:

| Plastisol based on impact additive No. | Percent benzyl acrylate in impact additive | Clarity of dried plastisol coating | |
|---|---|---|---|
| 1 | 45 | Slight haze. | ↑ |
| 2 | 50 | Very slight haze. | |
| 3 | 55 | Clear. | Clearer |
| Control[1] | | Clear. | |
| 9 | 60 | Clear. | |
| 4 | 60 | Clear. | |
| 5 | 65 | Very slight haze. | ↑ |
| 6 | 70 | Slight haze. | Clearer |
| 7 | 75 | Some haze. | |
| 8 | 80 | Some haze. | |

[1] The control comprised a sample of unmodified PVC which had been polymerized by means of the identical procedure described hereinabove with the exception that it was not conducted in the presence of an aqueous latex of an impact additive copolymer.

The results shown in the above table indicate that maximum clarity is achieved, with PVC as the substrate, using butyl acrylate:benzyl acrylate copolymer additives which contain from about 50–65%, by weight, of benzyl acrylate.

EXAMPLE VII

This example illustrates the results obtained upon evaluating the impact strength of the PVC containing the butyl acrylate:benzyl acrylate copolymer rubber additive incorporated therein; the preparation of the latter product having been described in Example VI hereinabove.

In evaluating these additive copolymers and interpolymer products, they were either milled alone or first diluted with the indicated amount of a commercially available polyvinyl chloride resin. In either case, the milling was conducted on a two-roll mill operating at 350–360° F. for a period of three minutes. As stabilizers, each sample contained 3 phr. of "Thermolite 31" and 0.5 phr. of calcium stearate. The following table describes the composition of the various samples which were evaluated as well as the results obtained.

| Product being tested | Percent of product used | Percent PVC used for dilution [a] | Final conc. of copolymer additive | Tensile impact strength [b] (ft./lbs./in.²) |
|---|---|---|---|---|
| Unmodified PVC control | 100 | | 0 | 95 |
| Impact additive copolymer No. 4 of Example V | 66 | 33 | 10 | 121 |
| Do | 100 | 0 | 15 | 147 |

[a] PVC having a relative viscosity of 2.11 as determined at 30° C. in a 1gm/deciliter solution of cyclohexanone.
[b] As determined by means of ASTM Procedure D-1822.

The results shown in the above table indicate the improved impact strength inherent in the compositions resulting from the process of this invention when compared with unmodified PVC. It is also to be noted that the products made with the additives of this invention all displayed excellent clarity.

EXAMPLE VIII

This example illustrates the preparation of a clear, impact resistant composition comprising a blend of a vinyl chloride:vinyl acetate copolymer and one of the novel impact additive copolymers of this invention.

To 100 gms. of an 85:15 vinyl chloride:vinyl acetate copolymer having an intrinsic viscosity of 1.5 as determined in a 1% solution of cyclohexanone at 25° C., there was added 37 gms. of the rubber copolymer latex from recipe No. 4 of Example I, hereinabove. The resin-latex mixture was air dried to remove the water whereupon the resulting product could be formed into PVC sheets having good clarity and impact strength.

EXAMPLE IX

In another variaiton of the process of this invention, it is possible to graft a methyl methacrylate homo- or copolymer, i.e. polymethyl methacrylate or a copolymer of methyl methacrylate with a minor proportion of one or more ethylenically unsaturated comonomers such as ethyl acrylate, onto the previously polymerized particles of one of the above described impact additive rubber copolymers of this invention and to then use the resulting product as an impact additive for PVC or for a rigid copolymer of vinyl chloride. The preparation and use of such a product is illustrated hereinbelow.

The following reactants were placed in a one quart bottle which was capped and heated at 70° C. while being rotated for 1½ hours at 18 r.p.m.:

268 gms. of the copolymer latex from Recipe No. 5 of Example I hereinabove (75 gms. of rubber)
68 gms. of methyl methacrylate monomer
7 gms. of ethyl acrylate
17 gms. of a 2% aqueous solution of $K_2S_2O_8$
140 gms. water.

A latex having a resin solids content of 30%, by weight, was obtained which was then air dried so as to obtain a solid polymer product. When this polymer was added to PVC at a 10–20 phr. level it formed a clear blend with improved impact resistance.

Variations may be made in proportions, procedures and materials without departing from the scope of this invention as defined in the following claims.

What is claimed is:

1. A clear, impact resistant thermoplastic polymer composition comprising an intimate admixture of:
    (1) a polymer substrate selected from the group consisting of polyvinyl chloride and the copolymers of vinyl chloride with a minor proportion of at least one ethylenically unsaturated comonomer and
    (2) an impact additive of from 1 to 35% by weight, of the composition, comprising a copolymer of:
        (a) at least one $C_1$–$C_{12}$ alkyl acrylate ester and
        (b) a second monomer consisting of vinylidene chloride, wherein said impact additive copolymer has a monomer ratio of alkyl acrylate ester to vinylidene chloride in the range of from about 35:65 to 55:45 so as to obtain a composition wherein the refractive index of said impact additive is essentially identical to the refractive index of said substrate admixed therewith.

2. The composition of Claim 1, wherein said polymer substrate is a copolymer of vinyl chloride with a minor proportion of vinyl acetate.

3. The composition of Claim 1, wherein the $C_1$–$C_{12}$ alkyl acrylate of said impact additive copolymer is butyl acrylate.

4. The composition of Claim 1, wherein said impact additive copolymer also contains at least one crosslinking comonomer having at least two reactive vinyl groups.

5. The composition of Claim 4, wherein said crosslinking comonomer is butylene glycol dimethacrylate.

6. The composition of Claim 1, wherein said impact additive copolymer contains at least one additional non-crosslinking comonomer.

7. The composition of Claim 1, wherein said polymer substrate is present in and/or around particles of said impact additive copolymer.

8. A method for the preparation of a clear, impact resistant, thermoplastic polymer composition, said method comprising the intimate admixture of:
    (1) a polymer substrate selected from the group consisting of polyvinyl chloride and the copolymers of vinyl chloride with a minor proportion of at least one ethylenically unsaturated comonomer with
    (2) an impact additive of from 1 to 35% by weight, of the composition, comprising a copolymer of:
        (a) at least one $C_1$–$C_{12}$ alkyl acrylate ester and
        (b) a second monomer consisting of vinylidene chloride, wherein said impact additive copolymer has a monomer ratio of alkyl acrylate ester to vinylidene chloride in the range of from about 35:65 to 55:45 so as to obtain a composition wherein the refractive index of said impact additive is essentially identical to the refractive index of said substrate admixed therewith.

9. The method of Claim 8, wherein said polymer substrate is polyvinyl chloride.

10. The method of Claim 8, wherein said polymer substrate is a copolymer of vinyl chloride with a minor proportion of vinyl acetate.

11. The method of Claim 1, wherein the $C_1-C_{12}$ alkyl acrylate of said impact additive copolymer is butyl acrylate.

12. The method of Claim 8, wherein said impact additive copolymer also contains at least one crosslinking comonomer having at least two reactive vinyl groups.

13. The method of Claim 12, wherein said crosslinking comonomer is butylene glycol dimethacrylate.

14. The method of Claim 8, wherein said impact additive copolymer contains at least one additional non-crosslinking comonomer.

15. The method of Claim 8, wherein the intimate admixture of said polymer substrate with said impact additive copolymer is effected by polymerizing said polymer substrate in the presence of said impact additive copolymer.

16. The method of Claim 15, wherein said polymer substrate is suspension polymerized while in the presence of an aqueous emulsion containing particles of said impact additive copolymer.

17. The method of Claim 15, wherein said polymer substrate is emulsion polymerized while in the presence of an aqueous emulsion containing particles of said impact additive copolymer.

18. The product resulting from the process of Claim 16.

19. The product resulting from the process of Claim 17.

20. The composition of Claim 1, wherein said impact additive copolymer exists in a concentration of from about 5 to 15% by weight.

21. The composition of Claim 1, wherein one or more optional additives selected from the group consisting of plasticizers, lubricants and stabilizers, are included.

22. The composition of Claim 1, wherein the refractive index is from about 1.53–1.54.

23. The composition of Claim 3, wherein said impact additive consists of a copolymer of butyl acrylate and vinylidene chloride, and contains from about 55 to 60% by weight, of vinylidene chloride.

24. The composition of Claim 23 wherein styrene is substituted for a portion of the vinylidene chloride.

References Cited

UNITED STATES PATENTS

| | | | |
|---|---|---|---|
| 3,632,679 | 1/1972 | De Witt et al. | 260—878 R |
| 2,992,203 | 7/1961 | Protzman | 260—885 |

MURRAY TILLMAN, Primary Examiner

C. J. SECCURO, Assistant Examiner

U.S. Cl. X.R.

260—23 AR, 31.8 M, 45.75 K, 80.81, 86.1 E, 86.3, 898, 901

UNITED STATES PATENT OFFICE
CERTIFICATE OF CORRECTION

PATENT NO. : 3,840,620
DATED : October 8, 1974
INVENTOR(S) : Ruth Gallagher

It is certified that error appears in the above-identified patent and that said Letters Patent are hereby corrected as shown below:

Column 2, line 42, the term "discarboxylic" should read -- dicarboxylic --.

Column 3, line 20, the term "0.05" should read -- 0.25 --.

Column 3, line 64, the term "aryloni" should read -- acryloni --.

Column 6, line 17, the term "CaZn" should read -- Ca/Zn --.

Column 6, line 37, the term "the" should read -- this --.

In the tabulation bridging columns 5 and 6 entitled "Initial Composition of Polymerization Recipe", the recitation in footnote 1 lacks a slash mark between "acrylate and vinylidene", between "chloride" and "butylene", and between "dimethacrylate" and "styrene". Thus, the terms should read -- acrylate/vinylidene --, -- chloride/butylene --, and -- dimethacrylate/styrene --.
At Column 7, in the tabulation appearing after line 57, in the 4th line of footnote 1, the term, "atex" should read -- latex --.
Column 9, line 3, the term "dilated" should read -- diluted --.

UNITED STATES PATENT OFFICE
CERTIFICATE OF CORRECTION

PATENT NO. : 3,840,620

DATED : October 8, 1974

INVENTOR(S) : Ruth Gallagher

It is certified that error appears in the above-identified patent and that said Letters Patent are hereby corrected as shown below:

In the table bridging columns 9 and 10 at line 15, in footnote a, the term "0.11" should read -- 2.11 --.

In the table at column 10, starting at line 33, entitled "Initial Composition of Polymerization Recipe", in the 5th column from the left, entitled "1% solution of methylis cellulose", the term "methylis" should read -- methyl --.

At column 11 line 72, the term "variaiton" should read -- variation --.

At column 13, in claim 11, the term "claim 1" should read -- claim 8 --.

Signed and Sealed this eleventh Day of May 1976

[SEAL]

Attest:

RUTH C. MASON
Attesting Officer

C. MARSHALL DANN
Commissioner of Patents and Trademarks